(12) United States Patent
Wu (10) Patent No.: US 6,770,126 B1
(45) Date of Patent: Aug. 3, 2004

(54) FAST DRY INK CONTAINING ALKYL SACCHARIDE AND METHODS OF MAKING AND USING SAID INK

(75) Inventor: Jin Wu, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/342,352

(22) Filed: Jan. 15, 2003

(51) Int. Cl.$^7$ ............................................. C09D 11/02
(52) U.S. Cl. .............................. 106/31.36; 106/31.86; 347/100
(58) Field of Search .......................... 106/31.36, 31.86; 347/100

(56) References Cited

U.S. PATENT DOCUMENTS

| | | | |
|---|---|---|---|
| 4,251,824 A | 2/1981 | Hara et al. | |
| 4,410,889 A | 10/1983 | Bryant et al. | |
| 4,412,224 A | 10/1983 | Sugitani | |
| 4,463,359 A | 7/1984 | Ayata et al. | |
| 4,532,530 A | 7/1985 | Hawkins | |
| 4,601,777 A | 7/1986 | Hawkins et al. | |
| 4,840,674 A | 6/1989 | Schwarz | |
| 4,877,451 A | 10/1989 | Winnik et al. | |
| 5,133,803 A | * 7/1992 | Moffatt | 106/31.37 |
| 5,139,574 A | 8/1992 | Winnik et al. | |
| 5,145,518 A | 9/1992 | Winnik et al. | |
| 5,207,824 A | 5/1993 | Moffatt et al. | |
| 5,281,261 A | 1/1994 | Lin | |
| 5,356,464 A | 10/1994 | Hickman et al. | |
| 5,378,574 A | 1/1995 | Winnik et al. | |
| 5,531,818 A | 7/1996 | Lin et al. | |
| 5,944,650 A | 10/1997 | Hu et al. | |
| 5,693,129 A | 12/1997 | Lin | |
| 5,766,818 A | 6/1998 | Smith et al. | |
| 5,993,527 A | * 11/1999 | Tochihara et al. | 106/31.85 |
| 6,329,446 B1 | 12/2001 | Sacripante et al. | |
| 6,419,356 B1 | * 7/2002 | Sadasivan et al. | 347/105 |

* cited by examiner

Primary Examiner—Mark L. Bell
Assistant Examiner—Veronica F. Faison
(74) Attorney, Agent, or Firm—Oliff & Berridge, PLC (57) ABSTRACT

An ink jet ink composition includes a liquid vehicle, a colorant and at least one alkyl saccharide surfactant having at least one sugar moiety head and at least one alkyl chain tail.

24 Claims, 3 Drawing Sheets

FAST DRY INK CONTAINING ALKYL SACCHARIDE AND METHODS OF MAKING AND USING SAID INK

BACKGROUND OF THE INVENTION

1. Field of Invention

The present invention is directed to an ink composition, and methods of making and using the ink composition. More specifically, the present invention is directed to fast drying ink jet ink containing alkyl saccharide surfactants, and methods of making and using such inks.

2. Description of Related Art

Ink jet printing is a non-impact printing method that produces droplets that are deposited on a print substrate (recording medium) such as plain paper, coated paper, transparent film (transparency), textile, or the like in response to electronic digital signals. Thermal or bubble jet drop-on-demand ink jet printers have found broad applications as output for personal computers in the office and at home.

In existing thermal ink jet printing processes, the print head typically comprises one or more ink jet ejectors. Each ejector includes a channel communicating with an ink supply chamber or manifold at one end, and having an opening at an opposite end referred to as a nozzle. A thermal energy generator, usually a resistor, is located in each of the channels at a predetermined distance from the nozzles. The resistors are individually addressed with a current pulse to shortly vaporize the ink within each respective channel to form a bubble that expels an ink droplet. As the bubble grows, the ink rapidly bulges from the nozzle and is shortly contained by the surface tension of the ink as a meniscus. This is a temporary phenomenon, and the ink is quickly propelled toward a print sheet.

As the bubble begins to collapse, the ink remaining in the channel between the nozzle and the bubble start to move toward the collapsing bubble, causing volumetric contraction of the ink at the nozzle resulting in the separation of the bulging ink from the nozzle as a droplet. The acceleration of the ink out of the nozzle while the bubble is growing provides sufficient momentum and velocity to propel the ink droplet in a substantially straight-line direction towards a print substrate. Subsequently, the ink channel refills by capillary action and is ready for the next repeating thermal ink jet process.

Thermal ink jet process are well known and described in, for example, U.S. Pat. Nos. 4,251,824, 4,410,889, 4,412,224, 4,463,359, 4,532,530, 4,601,777, 5,139,574, 5,145,518 and 5,281,261, the entire disclosures of which are incorporated herein by reference. Because the droplet of ink is emitted only when the thermal energy generator is actuated, this type of thermal ink jet printing is known as "drop-on-demand" printing. Other types of drop-on-demand printing, such as piezoelectric ink jet printing and acoustic ink jet printing, are also known.

Continuous ink jet printing is also known. In continuous ink jet printing systems, ink is emitted in a continuous stream under pressure through at least one orifice or nozzle. Multiple orifices or nozzles can be used to increase imaging speed and throughput. The ink is perturbed while being ejected from an orifice, causing the ink to break up into droplets at a fixed distance from the orifice. At the point of break-up, the electrically charged ink droplets pass through an applied electrode that switches on and off in accordance with digital data signals. Charged ink droplets pass through a controllable electric field that adjusts the trajectory of each ink droplet in order to direct it either to a gutter for ink deletion and recirculation or to a specific location on a recording substrate to create images.

In an ink jet printing apparatus, the print head typically comprises a linear array of ejectors, and the print head moves relative to the surface of the print substrate, either by moving the print substrate relative to a stationary print head, or vice-versa, or both. In some types of apparatuses, at least a relatively small print head supplied with ink moves across a print sheet numerous times in swathes in order to complete an image. For multicolor ink jet printing, a set of print heads supplied with ink (e.g., cyan, magenta, yellow and/or black) can move across the print substrate numerous times in swathes and disperse selected inks in any desired pattern (e.g., ⅛, ¼, ½, full tone), according to digital signals.

The speed of this type of single or multiple color ink jet printing on a substrate is determined by the moving speed of the print heads across the print substrate, ink jetting frequency (or frequency response), and the desired number of swathes needed for printing. The printing speed of this type of ink jet apparatus can be increased if two or more print heads are butted together to form a partial-width array print head for printing each ink in a monochrome or multicolor ink jet printing system. The partial-width ink jet print head has more ink jet nozzles per print head, and can deliver a large number of ink droplets across the substrate in a swath in a short period. Monochrome or multicolor ink jet printing apparatuses using one or several partial-width print heads may have a faster printing speed than current commercial ink jet printers.

Alternatively, a print head that consists of an array of ejectors (e.g., several butted print heads to give a full-width array print head) and extends the full width of the print substrate may pass an ink down once onto the print substrate to give full-page images, in what is known as a "full-width array printer." When the print head and the print substrate are moved relative to each other, image-wise digital data is used to selectively activate the thermal energy generators in the ink jet print head over time so that desired images will be created on the print substrate at a fast speed. For multicolor ink jet printing, several full-width array print heads and inks (e.g., cyan, magenta, yellow and black) can be used to deliver multi-color inks onto a print sheet. This type of multicolor ink jet printing process is capable of printing multi-color images and monochrome color images on a print substrate at a much faster speed than current commercial color ink jet printers.

In current ink jet printing processes, surfactants are used in the ink to decrease the surface tension of the ink for faster penetration into the print substrate. Examples of these conventional surfactants include polyethylene glycol (PEG), polypropylene glycol (PPG), copolymers thereof and polyethylene glycol/polysiloxane copolymers.

SUMMARY OF THE INVENTION

Applicants have discovered that known surfactants, in decreasing the surface tension of inks for faster penetration and therefore fast drying, result in a decrease in print quality. Applicants have also discovered that known methods for increasing the speed of penetration (i.e., decreasing ink drying time) result in a decrease in print quality. A decrease in print quality can be seen as increased mid frequency line edge noise (MFLEN) and detrimental optical density (OD) effects. Current surfactants and methods, therefore, sacrifice print quality for an increased drying rate of ink jet inks.

The present invention is directed to an ink jet ink composition that comprises at least one alkyl saccharide surfactant that includes at least one hydrophilic saccharide group head connected to at least one hydrophobic alkyl chain tail. The present invention is also directed to methods of making and using such an ink jet ink composition. Applicants have discovered that such a surfactant at least decreases the surface tension of the ink for faster penetration and a decrease in drying time, while the at least one hydrophobic alkyl chain of such a surfactant at least attaches to the ink pigments, and the at least one saccharide moiety of such a surfactant at least keeps the ink pigments on the surface of the printing substrate, such as paper, through affinity interactions to maintain a high print quality. Ink jet ink compositions according to this invention, and methods of making and using the ink jet ink compositions, provide at least the advantage of an increased drying rate of ink jet inks while maintaining a comparable print quality as compared to known ink jet ink compositions that do not include at least one alkyl saccharide surfactant.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

According to the present invention, at least one ink in a monochrome or multicolor ink jet printing process comprises at least one surfactant defined by at least one saccharide moiety head attached to at least one hydrophobic alkyl chain tail. The at least one alkyl chain is hydrophobic enough to attach to a pigment particle, while the at least one saccharide moiety helps salvation at the periphery.

In more detail, ink jet ink compositions of the present invention generally include at least a liquid vehicle, a colorant and at least one alkyl saccharide surfactant. The inks can also include any of various optional additives that are well known in the art for ink jet ink compositions.

The liquid vehicle is preferably an aqueous liquid vehicle. The liquid vehicle can consist solely of water, or it can comprise a mixture of water and a water-soluble or water-miscible organic component. Suitable components for the liquid vehicle include, but are not limited to, water, ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, other water-soluble or water-miscible materials, mixtures thereof, and the like. When mixtures of water and water-soluble or miscible organic liquids are selected as the liquid vehicle, the water to organic ratio can range from 100:0 to 0:100. The water to organic ratio typically ranges from about 100:0 to about 30:70, and preferably from about 97:3 to about 40:60. However, amounts outside these ranges can be used, as desired. The non-water component of the liquid vehicle generally serves as a humectant or cosolvent, which has a boiling point higher than that of water (100° C).

Further examples of suitable humectants are disclosed, for example, in U.S. Pat. Nos. 5,281,261, 5,531,818, 5,693,129, and 4,840,674, the disclosures of which are incorporated herein by reference in their entireties.

In embodiments of the ink jet ink compositions of the present invention, the liquid vehicle is typically present in an amount of from about 80 to about 99.9 percent by weight of the ink, and preferably from about 90 to about 99 percent by weight of the ink. However, the amount of the liquid vehicle can be outside these ranges, if desired.

Embodiments of the ink jet ink compositions of the present invention also include at least one alkyl saccharide surfactant. Suitable alkyl saccharide surfactants include, but are not limited to, such compounds where at least one saccharide moiety head is attached to at least one alkyl chain tail. Thus, in compounds suitable for use in the present invention, the alkyl saccharide surfictant can include one or more saccharide moieties and one or more alkyl chains, as desired. Preferably, the alkyl saccharide surfactant is an alkyl polyglycoside, such as those depicted by the formula: $RO(S)_n$, wherein R is an alkyl chain having from about eight to about 18 carbon atoms; S is a saccharide moiety having about five or six carbons atoms; and n is a number having a value from about one to about six. S could also be an open-ringed saccharide containing from about two to about eight hydroxyl groups, such as a polyol, including sorbitol, maltitol and glucitol.

Such alkyl polyglycosides are alkyl polyglucosides wherein the alkyl groups contain from about eight to about 18 carbon atoms and the saccharide moiety is derived from glucose. Such alkyl polyglucosides are made by reacting a mixture for fatty alcohols having eight to 18 carbon atoms and glucose, and are available commercially, for example from Cognis Corporation as GLUCOPON® 220UP GLUCOPON® 225DK, APG® 325N, GLUCOPON® 425N, GLUCOPON® 600UP and GLUCOPON® 625UP. These alkyl polyglycosides have an average degree of polymerization, which is typically defined as the average number of repeat units, or in this case glucose units, per polymer chain, in the range of about 1.4 to about 1.6. The pH of the alkyl polyglycoside is typically in the range of about six to about 12.

In embodiments, a single hydrophilic saccharide moiety is attached to a single alkyl chain, or two hydrophilic saccharide moieties are attached to two alkyl chains, or more than two hydrophilic saccharide moieties are connected to more than two alkyl chains. These surfactants having more than one hydrophilic saccharide groups and more than one hydrophobic alkyl chain are commonly called gemini surfactants. Some examples are listed below:

In other embodiments, the number of saccharide moieties and alkyl chains may vary, according to desired drying rate and print quality, and need not be present in the same amount. For example, in embodiments, alkyl saccharide surfactants according to the invention may include two saccharide moieties and three alkyl chains, or other combinations thereof. In various embodiments, the surfactant is included in an amount of from about 0.1 to about 30% by weight of the total weight of the ink jet ink composition, preferably from about 0.1 to about 20% by weight of the total weight of the ink jet ink composition, preferably from about 0.5 to about 5% by weight of the total weight of the ink jet ink composition, and preferably from about 0.5 to about 1% by weight of the total weight of the ink jet ink composition. In various embodiments, the alkyl chain comprises from about six to about 30 carbon atoms, preferably about eight to about 18 carbon atoms, and preferably about 10 to about 16 carbon atoms.

Embodiments of the ink jet ink compositions of the present invention also generally contain a colorant. The colorant can be either a dye or a pigment, or can be more than one dye, more than one pigment, or a mixture of one or more dyes and one or more pigments. In various embodiments, ink compositions according to the invention may comprise 1–5% of a colorant.

According to the present invention, alkyl saccharide surfactants are particularly beneficial in ink jet ink compositions that include carbon black as the colorant. In embodiments, the alkyl saccharide surfactant provides the desired beneficial effects of reducing the drying time of the ink composition while maintaining good print quality on the print substrate. However, it is apparent that the surfactant can be used in ink jet ink compositions utilizing other colorants, to provide the same desired results. In addition, alkyl saccharide surfactants according to the invention make ink jet ejector functions more robust for salted dye-based inks.

Any suitable or desired dye can be employed in the ink composition, including anionic dyes, cationic dyes, nonionic dyes, zwitterionic dyes, and the like. Examples of suitable dyes include, but are not limited to, food dyes such as Food Black No. 1, Food Black No. 2, Food Red No. 40, Food Blue No. 1, Food Yellow No. 7, and the like; FD & C dyes; Acid Black dyes (such as No. 1, 7, 9, 24, 26, 48, 52, 58, 60, 61, 63, 92, 107, 109, 118, 119, 131, 140, 155, 156, 172, 194, and the like); Acid Red dyes (such as No. 1, 8, 32, 35, 37, 52, 57, 92, 115, 119, 154, 249, 254, 256, and the like); Acid Blue dyes (such as No. 1, 7, 9, 25, 40, 45, 62, 78, 80, 92, 102, 104, 113, 117, 127, 158, 175, 183, 193, 209, and the like); Acid Yellow dyes (such as No. 3, 7, 17, 19, 23, 25, 29, 38, 42, 49, 59, 61, 72, 73, 114, 128, 151, and the like); Direct Black dyes (such as No. 4, 14, 17, 22, 27, 38, 51, 112, 117, 154, 168, and the like); Direct Blue dyes (such as No. 1, 6, 8, 14, 15, 25, 71, 76, 78, 80, 86, 90, 106, 108, 123, 163, 165, 199, 226, and the like); Direct Red dyes (such as No. 1, 2, 16, 23, 24, 28, 39, 62, 72, 236, and the like); Direct Yellow dyes (such as No. 4, 11, 12, 27, 28, 33, 34, 39, 50, 58, 86, 100, 106, 107, 118, 127, 132, 142, 157, and the like); anthraquinone dyes; monoazo dyes; disazo dyes; phthalocyanine derivatives, including various phthalocyanine sulfonate salts; aza(18)annulenes; formazan copper complexes; triphenodioxazines; Beeracid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X34, available from BASF; Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Beerorcolor A.Y. 34; Telon Fast Yellow 4GL-1 75; BASF Basacid Black SE 0228; the Pro-Jet™ series of dyes available from ICI, including Pro-Jet™ Yellow I (Direct Yellow 86), Pro-Jet™ Magenta I (Acid Red 249), Pro-Jet™ Cyan I (Direct Blue 199), Pro-Jet™ Black I (Direct Black 168), and Pro-Jet™ Yellow 1 -G (Direct Yellow 132); Aminyl Brilliant Red F-B, available from Sumitomo Chemical Company (Japan); the Duasyn™ line of "salt-free" dyes available from Clariant Corp., Charlotte, N.C., such as Duasyn™ Direct Black HEF-SF (Direct Black 168), Duasyn™ Black RL-SF (Reactive Black 31), Duasyn™ Direct Yellow 6G-SF VP216 (Direct Yellow 157), Duasyn™ Brilliant Yellow GL-SF VP220 (Reactive Yellow 37), Duasyn™ Acid Yellow XX-SF LP413 (Acid Yellow 23), Duasyn™ Brilliant Red F3B-SF VP218 (Reactive Red 180), Duasyn™ Rhodamine B-SF VP353 (Acid Red 52), Duasyn™ Direct Turquoise Blue FRL-SF VP368 Direct Blue 199), and Duasyn™ Acid Blue AE-SF VP344 (Acid Blue 9); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Sevron Blue 5GMF (ICI); various Reactive dyes, including Reactive Black dyes, Reactive Blue dyes, Reactive Red dyes, Reactive Yellow dyes, and the like; mixtures thereof; and the like.

Generally, the dye is present in embodiments of the ink jet ink composition in any desired or effective amount, such as to provide the desired color strength, optical density and the like. In embodiments, the dye is typically present in an amount of from about 0.05 to about 15% by weight of the ink jet ink composition, preferably from about 0.1 to about 10% by weight of the ink jet ink composition, and preferably from about 1 to about 5% by weight of the ink jet ink composition. However, amounts outside of these ranges can also be used as desired.

Examples of suitable pigments for embodiments of the ink jet ink compositions of the present invention include, but are not limited to, various carbon blacks such as channel black, furnace black, lamp black, oxidized carbon black, and the like. Suitable colorants include, but are not limited to, red, green, blue, brown, magenta, cyan, and yellow particles, as well as mixtures thereof.

Illustrative examples of magenta colorants include, but are not limited to, 2,9-dimethyl-substituted quinacridone and anthraquinone dye, identified in the Color Index as CI 60710; C1 Dispersed Red 15; a diazo dye identified in the Color Index as CI 26050; CI Solvent Red 19; and the like.

Illustrative examples of suitable cyan colorants include, but are not limited to, copper tetra-4-(octadecyl sulfonamido) phthalocyanine; X-copper phthalocyanine pigment, listed in the Color Index as CI 74160; CI Pigment Blue; Anthradanthrene Blue, identified in the Color Index as CI 69810; Special Blue X-2137; and the like.

Illustrative examples of yellow colorants include, but are not limited to, diarylide yellow 3,3-dichlorobenzidene acetoacetanilides; a monoazo pigment identified in the Color Index as CI 12700; CI Solvent Yellow 16; a nitrophenyl amine sulfonamide identified in the Color Index as Foron Yellow SE/GLN; CI Dispersed Yellow 33; 2,5-dimethoxy-4-sulfonanilide phenylazo-4'-chloro-2,5dimethoxy acetoacetanilide; Permanent Yellow FGL; and the like.

Additional examples of pigments include, but are not limited to, Raven™ 5250, Raven™ 5750, Raven™ 3500 and other similar carbon black products available from Columbia Company; Regal™ 330, Black Pearl™ L, Black Pearl™ 1300, and other similar carbon black products available from Cabot Company; Degussa carbon blacks such as Color Black™ series, Special Black™ series, Printtex™ series and Derussol™ carbon black dispersions available from Degussa Company; Hostafine™ series such as Hostafine™ Yellow GR (Pigment 13), Hostafine™ Yellow (Pigment 83), Hostafine™ Red FRLL (Pigment Red 9), Hostafine™ Rubine F6B (Pigment 184), Hostafine™ Blue 2G (Pigment Blue 15:3), Hostafine™ Black T (Pigment Black 7), and Hostafine™ Black TS (Pigment Black 7), available from Clariant Corp., Charlotte, N.C.; Normandy Magenta RD-2400 (Paul Uhlich); Paliogen Violet 5100 (BASF); Paliogen Violet 5890 (BASF); Permanent Violet VT2645 (Paul Ublich); Heliogen Green L8730 (BASF); Argyle Green XP-1 11-S (Paul Uhlich); Brilliant Green Toner GR 0991 (Paul Uhlich); Heliogen Blue L6900 and L7020 (BASF); Heliogen Blue D6840 and D7080 (BASF); Sudan Blue OS (BASF); PV Fast Blue B2G01 (Clariant Corp., Charlotte, N.C.); Irgalite Blue BCA (Ciba-Geigy); Paliogen Blue 6470 (BASF); Sudan III (Matheson, Coleman, Bell); Sudan II (Matheson, Coleman, Bell); Sudan IV (Matheson, Coleman, Bell); Sudan Orange 6 (Aldrich); Sudan Orange G (Aldrich); Sudan Orange 220 (BASF);

Paliogen Orange 3040 (BASF); Ortho Orange OR 2673 (Paul Uhlich); Paliogen Yellow 152 and 1560 (BASF); Lithol Fast Yellow 0991K (BASF); Paliotol Yellow 1840 (BASF); Novoperm Yellow F6 I (Clariant Corp., Charlotte, N.C.); Novoperm Yellow FG1 (Clariant Corp., Charlotte, N.C.); Permanent Yellow YE 0305 (Paul Uhlich); Lumogen Yellow D0790 (BASF); Suco-Gelb L1250 (BASF); Suco-Yellow D1355 (BASF); Hostaperm Pink E (Clariant Corp., Charlotte, N.C.); Fanal Pink D4830 (BASF); Cinquasia Magenta (DuPont); Lithol Scarlet D3700 (BASF); Tolidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company)); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); CAB-O-JET 200 hydrophilic carbon black (Cabot Corp.); CAB-O-JET 300 hydrophilic carbon black (Cabot Corp.); and the like.

Additional suitable commercially available pigment dispersions include, but are not limited to, the Hostafines available from Clariant Corp., Charlotte, N.C., including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Additional examples of suitable hydrophilic pigment particles include the colored silica particles prepared as disclosed in, for example, U.S. Pat. Nos. 4,877,451 and 5,378,574, the entire disclosures of which are incorporated herein by reference. Other pigments can also be selected.

Preferably, the pigment particle size is as small as possible to enable a stable colloidal suspension of the particles in the liquid vehicle and to prevent clogging of the ink channels when the ink is used in a printer such as a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in an amount of from about 0.1 to about 8% by weight of the ink, and preferably from about 2 to about 7% by weight of the ink. However, amount outside these ranges can also be used as desired.

In embodiments of the ink jet ink compositions of present invention, the pigment particles can optionally be present in combination with a resin emulsion, wherein the resin emulsion generally acts as a dispersing agent for the pigment particles. The resin emulsion typically comprises resin particles and solubilized resin derived from the polymerization in water of an olefinic acid, such as acrylic acid or methacrylic acid, and an olefinic acrylate or methacrylate, such as methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, lauryl acrylate, lauryl methacrylate, stearyl acrylate, stearyl methacrylate, dodecyl acrylate, dodecyl methacrylate, benzyl acrylate, benzyl methacrylate, polyethyleneglycol acrylate, polyethyleneglycol methacrylate, polyoxyalkylene acrylate, polyoxyalkylene methacrylate, or the like. Typical polyoxyalkylene acrylates and methacrylates include those of the general formula:

wherein $R_1$ and $R_2$ are independently a hydrogen atom or an alkyl group, typically with from one to about six carbon atoms, and n is a number representing the number of repeat monomer units, typically being from about two to about 100.

The resin typically has a number average molecular weight (Mn) of from about 1,000 to about 15,000 and a weight average molecular weight (Mw) of from about 1,500 to about 40,000, although the molecular weight values can be outside of these ranges. The resin particles typically have an average particle diameter of from about 30 to about 300 nanometers, although the average particle diameter can be outside of this range. The resin emulsion typically comprises from about 60 to about 99% by weight resin particles and from about 1 to about 40% by weight solubilized resin, and preferably comprises from about 90 to about 97% by weight resin particles and from about 3 to about 10% by weight solubilized resin, although the relative amounts can be outside of these ranges. Both the resin particles and the solubilized resin can be generated from a free radical type process in water, wherein one of the monomers is water soluble, such as an acrylic acid or a methacrylic acid, and the other monomer(s) exhibit low solubility in water (for example, from about 0.05 to about 2% by weight soluble in water), such as an alkyl acrylate or an alkyl methacrylate or a polyoxyalkylene(meth)acrylate.

The free radical initiator is generally an emulsion type initiator, such as a persulfate, like potassium or ammonium persulfate. Chain transfer agents can be used to adjust the molecular weight of the resin and to adjust the resin particle to the solubilized resin ratio. Suitable chain transfer agents include, but are not limited to, alkylthiols, such as dodecanethiol, halogenated hydrocarbons, such as carbon tetrabromide, or, preferably, a combination of an alkylthiol and a halogenated hydrocarbon.

Additional surfactants can also be incorporated into the resin emulsion, including, but not limited to, anionic, cationic, and nonionic surfactants. Examples of suitable surfactants include sodium dodecylbenzene sulfonate, polyethylene oxide, polyethylene oxide nonyl phenyl ether, tetraalkyl ammonium chloride, sodium naphthalene sulfonate, and the like, typically present in an amount of from about 0.005 to about 20% by weight of the resin, and preferably from about 0.1 to about 5% by weight of the resin, although the amount can be outside of these ranges. Generally, the olefinic acidic monomer comprises from about 5 to about 20 parts by weight of the resins, the olefinic alkyl(meth)acrylate comprises from about 40 to about 60 parts by weight of the resins, and the polyethyleneglycol methacrylate, or, more generally, a low molecular weight polyethylene glycol capped with a methacrylate or acrylate, comprises from about 0 to about 20 parts by weight of the resins. Although both the resin particles and the solubilized resin are derived from the same monomers, the monomer content may be different in the resin particles as compared to the solubilized resin; more specifically, the solubilized resin may contain a higher content of acidic monomer than the resin particles.

Further information regarding resin emulsions suitable for dispersing pigment colorants is disclosed in, for example, U.S. Pat. No. 5,766,818; copending application U.S. Ser. No. 08/869,962, filed Jun. 5, 1997, entitled "Ink Compositions," with the named inventors Guerino G. Sacripante, Garland J. Nichols, Elizabeth A. Kneisel, and Chieh-Min Cheng; copending application U.S. Ser. No. 08/828,850, filed Mar. 31, 1997, entitled "Ink Compositions," with the named inventors Garland J. Nichols, Daniel G. Marsh, and Chieh-Min Cheng; and copending application U.S. Ser. No. 08/960,754, filed Oct. 29, 1997, entitled "Surfactants," with the named inventors Nan-Xing Hu, Paul F. Smith, and Beng S. Ong; the entire disclosures of which are incorporated herein by reference.

Embodiments of the ink jet ink compositions of the present invention can also be used in conjunction with the various ink additives including, but not limited to, anti-clogging agents, polymeric additives, anti-kogation additives, anti-curl agents, biocides, anti-bleed agents, color-bleeding additives, and pH buffering agents.

Suitable anti-clogging agents include, but are not limited to, polyethylene glycol, polypropylene glycol, poly(ethylene-co-propylene) glycol, polyhydric materials (materials containing more than one hydroxyl group), condensation products of diols or triols (e.g., glycerine, trimethylolpropane, triethanolamine) with ethylene oxide and/or propylene oxide.

Various polymeric binders can also be used in conjunction with the ink jet ink composition of the present invention to adjust the viscosity of the composition. Suitable polymeric binders include, but are not limited to, water soluble polymers and copolymers, such as gum, arabic, polyacrylate salts, polymethacrylate salts, polyvinyl alcohols, hydroxypropylenecellulose, hydroxyethylcellulose, polyvinylpyrrolidinone, polyvinylether, starch, polysaccharides, polyethyleneimines with or without being derivatized with ethylene oxide and propylene oxide including the Discole® series (DKS International); the Jeffamine® series (Texaco); and the like.

Polymeric additives may be present in embodiments of the ink jet ink compositions of the present invention in amounts from 0 to about 10% by weight of the total weight of the ink jet ink composition, preferably from about 0.001 to about 8% by weight of the total weight of the ink jet ink composition, and preferably from about 0.01 to about 5% by weight of the total weight of the ink jet ink composition, although the amount can be outside these ranges. The ink jet composition of the present invention can also comprise various anti-curl and/or anti-clogging agents. Suitable agents include, but are not limited to, those disclosed in U.S. Pat. No. 5,356,464 to Hickman et al. and U.S. Pat No. 5,207,824 to Moffatt et al.

Embodiments of the ink jet ink compositions of the present invention can also comprise various anti-bleed agents and/or additional drying time accelerating agents to reduce intra-color bleeding. Suitable agents include, but are not limited to, penetrants including hydroxyethers, including alkyl cellusolves® and alkyl carbitols® such as hexyl carbitol® and butyl carbitol; polyethylene glycol ether derivatives (such as alkyl ethers including methyl, ethyl, propyl, butyl, pentyl, hexyl, dodecyl, lauryl, stearyl, ether derivatives, phenyl and alkylphenyl ether derivatives of polyethylene glycols, and the like); and polypropylene glycol ether derivatives (such as alkyl ethers including methyl, ethyl, propyl, butyl, pentyl, hexyl, dodecyl, lauryl, stearyl ether derivatives, phenyl and alkylphenyl, ether derivatives of polyethylene glycols, and the like); and the like, and mixtures thereof.

Various pH buffers can also be included in embodiments of the ink jet ink compositions of the present invention. Suitable pH buffers include, but are not limited to, acids, bases, phosphate salts, carboxylate salts, sulfite salts, sulfate salts, amine salts, and the like. Such pH controlling agents are generally present in the amount from 0 to about 10% by weight of the ink, preferably from about 0.001 to about 5% by weight of the ink, and preferably from about 0.01 to about 5% by weight of the ink, although the amount can be outside of these ranges.

Embodiments of the ink jet ink compositions of the present invention also can be of any suitable or desired pH, and the pH can be controlled by the above-described or other pH controlling agents. For some applications, such as thermal ink jet printing processes, typical pH values are from about three to about 11, preferably from about five to about 10, and preferably from about six to about 8.5, although the pH can be outside of these ranges.

Embodiments of the ink compositions of the present invention can also include various biocides. Suitable biocides include, but are not limited to, biocides such as Dowicil® 150, 200, and 75, benzoate salts, sorbate salts, Proxcel® (available from ICI), and the like. When used, such biocides are generally present in an amount from 0 to about 10% by weight of the ink, preferably from about 0.001 to about 8% by weight of the ink, and preferably from about 0.01 to about 4% by weight of the ink, although the amount can be outside of these ranges.

Embodiments of the ink compositions of the present invention generally have a viscosity suitable for use in thermal ink jet printing processes. For example, at room temperature (i.e., about 25° C.), the ink compositions typically have a viscosity of no more than about 10 centipoise, preferably from about 1 to about 5 centipoise, and preferably from about 1 to about 4 centipoise, although the viscosity can be outside this range, particularly for applications such as acoustic ink jet printing.

Embodiments of the ink jet ink compositions of the present invention also preferably have a surface tension suitable for use in the desired printing process, such as a thermal ink jet printing process. Accordingly, the inks preferably have a surface tension of from about 30 to about 50 dynes per centimeter and preferably from about 35 or 40 to about 50 dynes per centimeter, although the surface tension can be outside of these ranges.

Embodiments of the ink compositions of the present invention, suitable for ink jet printing, can be prepared by any suitable process. Typically, embodiments of the ink compositions are prepared by simple mixing of the ingredients. Various embodiments entail mixing all of the ink composition ingredients together and filtering the mixture to obtain an ink. Embodiments of the ink compositions can be prepared by mixing the ingredients, heating if desired, and filtering, followed by adding any desired additional additives to the mixture and mixing at room temperature with moderate shaking until a homogeneous mixture is obtained, typically from about five to about 10 minutes. Alternatively, additives can be mixed with the other ink composition ingredients during the preparation process, which takes place according to any desired procedure, such as by mixing all the ingredients, heating if desired, and filtering.

Embodiments of the present invention are also directed to processes that entail incorporating the ink jet ink compositions of the present invention into an ink jet printing apparatus, and causing droplets of the ink to be ejected in an image-wise pattern onto a recording sheet, wherein the eventual printed image exhibits shortened drying time but substantially no change in the print quality as compared to a similar ink jet ink compositions that do not include the alkyl saccharide surfactant of the present invention. In various embodiments, the printing apparatus employs a thermal ink jet process wherein the ink in the nozzles is selectively heated in an image-wise pattern, thereby causing droplets of the ink to be ejected in image-wise pattern. In another preferred embodiment, the printing apparatus employs an acoustic ink jet process, wherein droplets of the ink are caused to be ejected in image-wise pattern by acoustic beams.

Any suitable substrate or recording sheet can be employed in embodiments of imaging processes of the present invention. Suitable substrates include, but are not limited to, plain papers such as Xerox™ 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

The present invention provides significant and unexpected results to the ink jet ink compositions. In particular, as discussed above and as demonstrated in the following Examples, the present invention provides ink jet ink compositions that have an unexpectedly improved drying time while maintaining and/or providing a high print quality.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLES

Comparative Example 1

A conventional ink jet ink composition, including a liquid vehicle and a colorant, is prepared. The conventional ink composition is prepared in accordance with the following formula, in parts by weight:

| | |
|---|---|
| IJX 157 carbon black (obtained from Cabot Corporation) | 22 |
| water | 40 |
| sulfolane | 30 |
| 2-pyrrolidinone | 8 |

Figure 1:
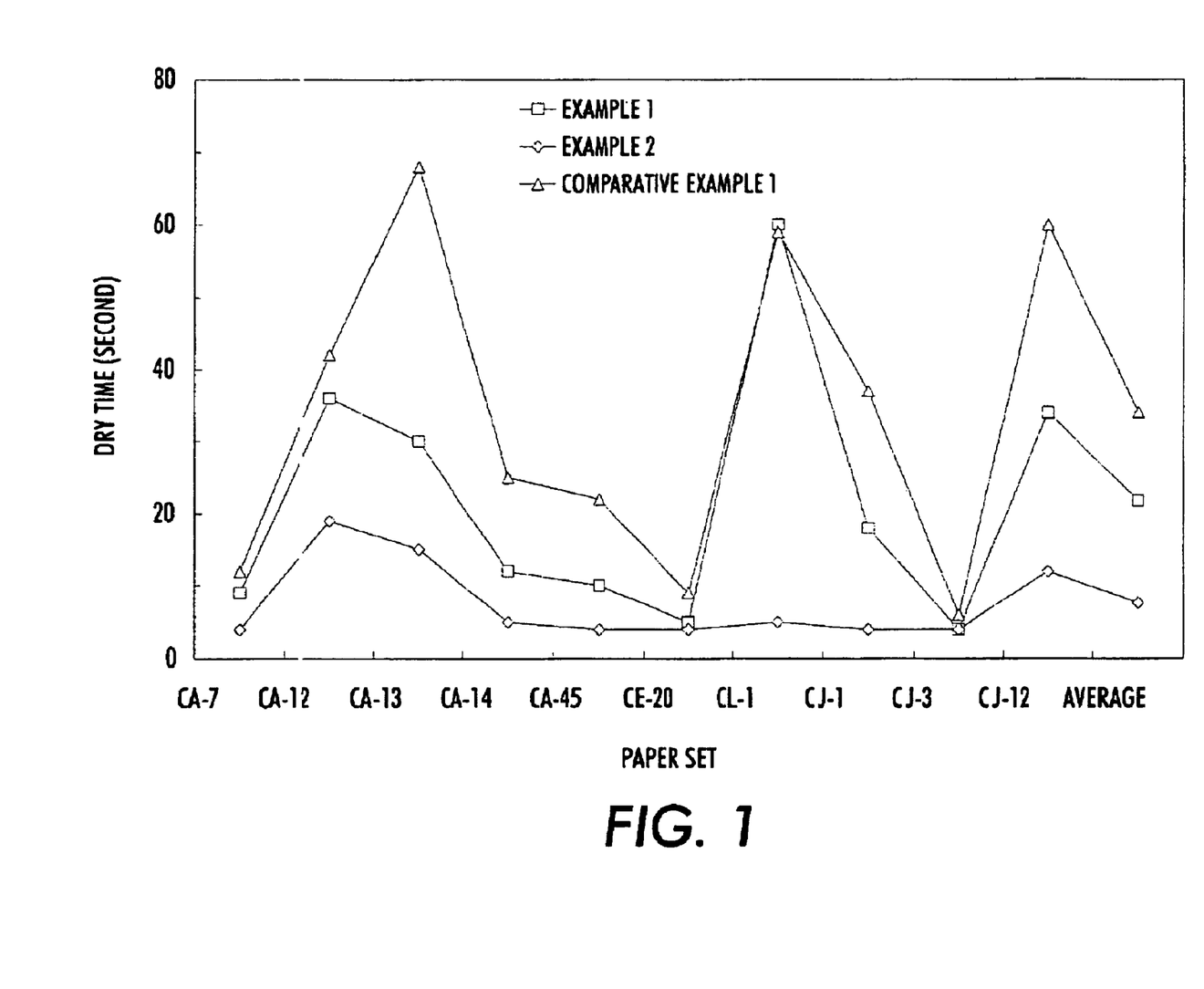
FIG. 1 is a graph illustrating the results of a comparison of the drying times for ink samples on various paper substrates.
Figure 2:
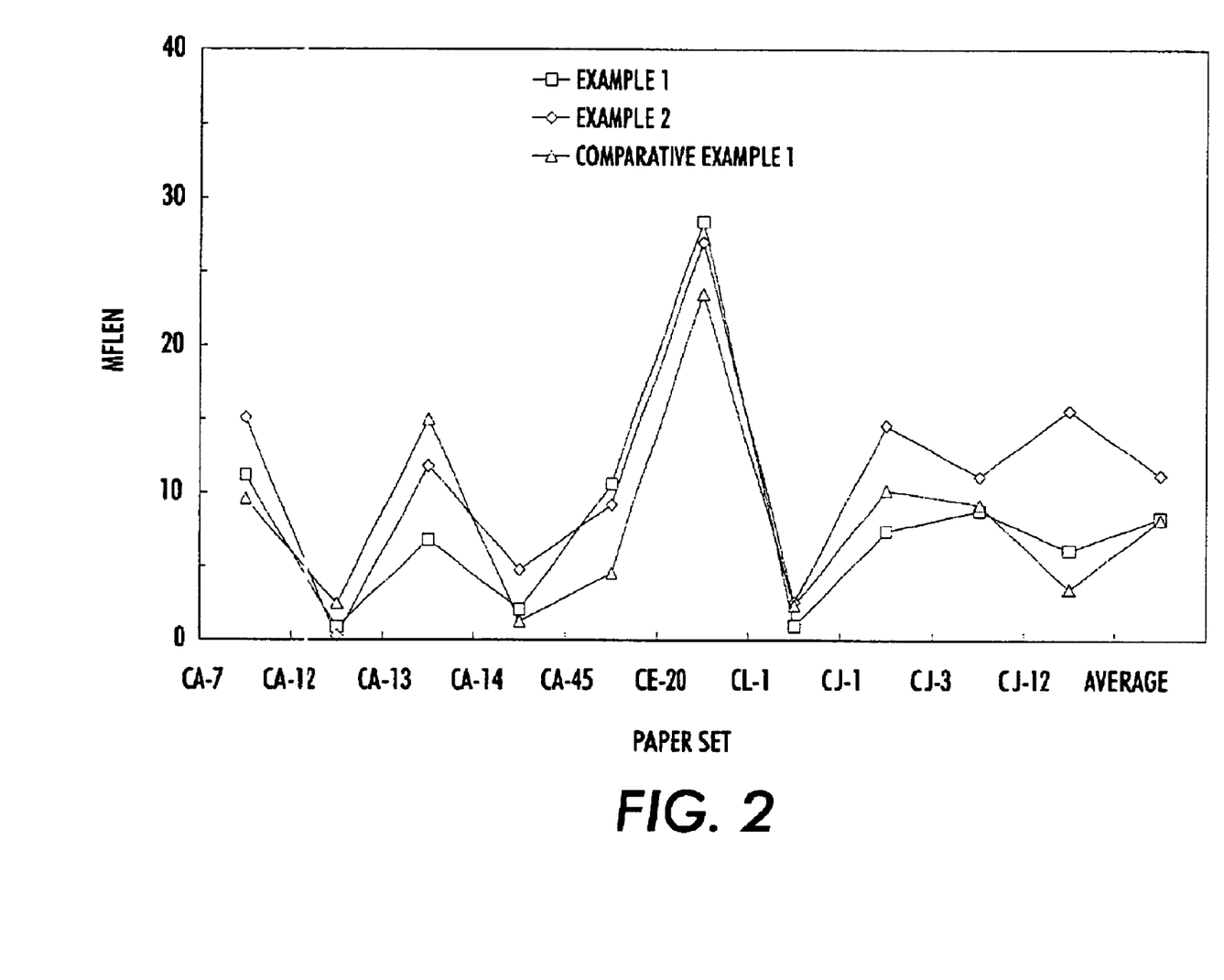
FIG. 2 is a graph illustrating the results of a comparison of the MFLEN for ink samples on various paper substrates.
Figure 3:
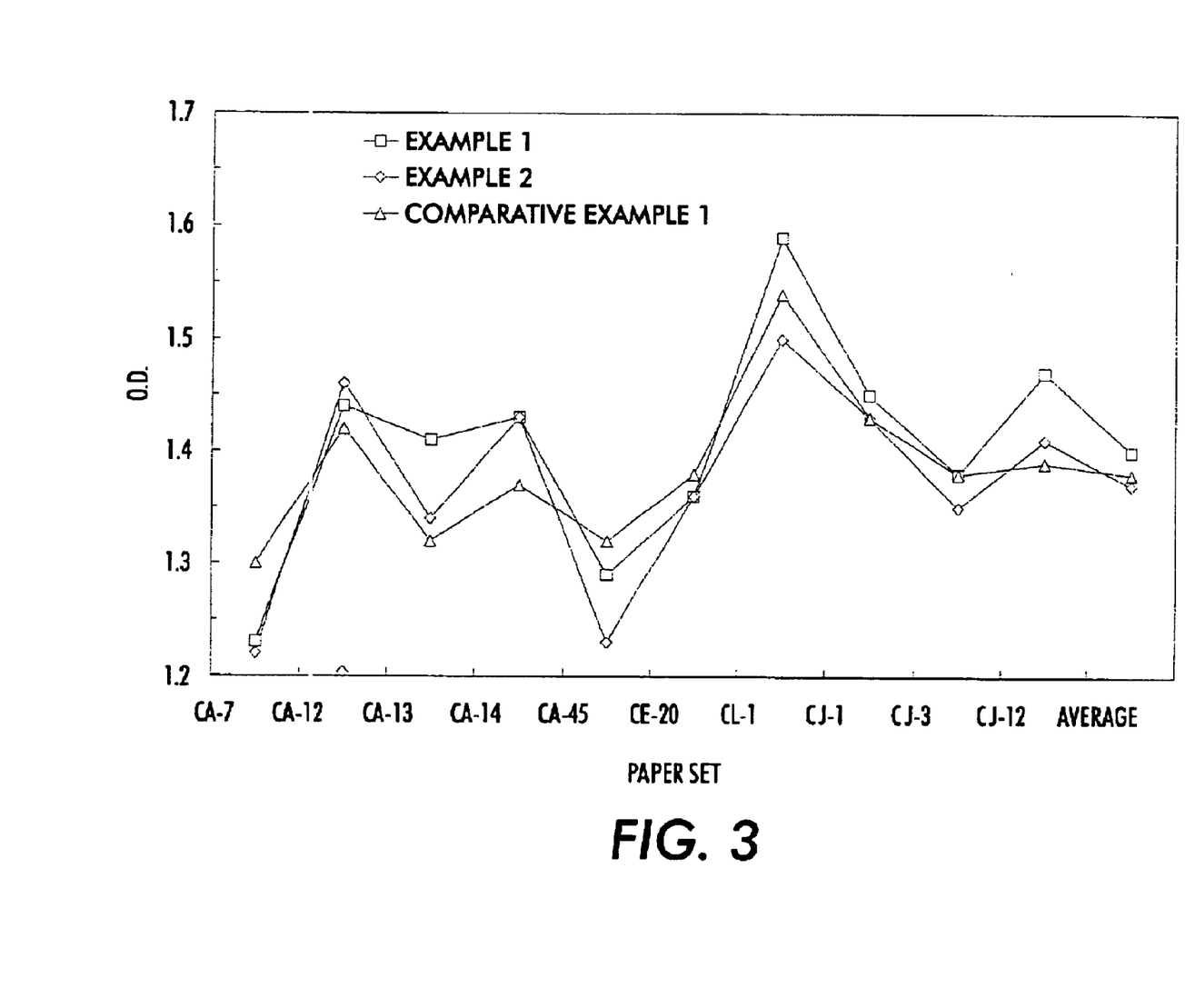
FIG. 3 is a graph illustrating the results of a comparison of the OD for ink samples on various paper substrates.

This conventional ink composition is used to print on 10 different paper types. The Dry Time, MFLEN and OD (optical density) are measured for this conventional ink composition on each of the 10 paper types, and the average Dry Time, MFLEN and OD are calculated for the values obtained on the 10 paper types. The Dry Time results are presented in FIG. 1; the MFLEN results are presented in FIG. 2; the OD results are presented in FIG. 3; and a summary of the average values for each of these three variables is presented in Table 1, below.

Examples 1 and 2

Ink jet ink compositions according to the invention are prepared as in Comparative Example 1 above, except that 1.0% by weight of an alkyl polyglycoside surfactant, or 0.5% by weight of an alkyl polyglycoside surfactant and 0.5% by weight of a penetrant, is added to the ink composition to replace 1.0% by weight of 2-pyrrolidinone. In Example 1, 1.0% by weight of GLUCOPON® 425N surfactant is used; and in Example 2, 0.5% by weight of the GLUCOPON® 425N surfactant is used, along with 0.5% by weight of the penetrant, 1-octyl-2-pyrrolidinone.

These ink compositions are also used to print on 10 different paper types. The Dry Time, MFLEN and OD are measured for these ink compositions. The Dry Time results are presented in FIG. 1; the MFLEN results are presented in FIG. 2; the OD results are presented in FIG. 3; and a summary of the average values for each of these three variables is presented in Table 1 below.

TABLE 1

| | Example 1 | Example 2 | Comparative Example 1 |
|---|---|---|---|
| MFLEN | 8.3 | 11.2 | 8.2 |
| O.D. | 1.4 | 1.37 | 1.38 |
| Dry Time (sec) | 21.8 | 7.6 | 34 |

As can be seen in Table 1, ink compositions according to the invention, comprising at least one alkyl saccharide surfactant defined by at least one saccharide moiety head attached to at least one hydrophobic alkyl chain tail, provide for a significant decrease in drying time, as compared to known inks that lack an alkyl saccharide surfactant, without causing an increase in mid frequency line edge noise (MFLEN) or a decrease in optical density, and thus without sacrificing print quality.

While this invention has been described in conjunction with the embodiments outlined above, it is evident that many alternatives, modifications and variations will be apparent to those skilled in the art. As explained above, the embodiments of the invention decrease drying time of liquid inks on various substrates without sacrificing print quality. Accordingly, the exemplary embodiments of the invention as set forth above are intended to be illustrative, not limiting. Various changes may be made without departing from the spirit and scope of the invention as defined in the following claims.

What is claimed is:

1. An ink jet ink composition comprising:
   a liquid vehicle,
   a colorant and
   at least one alkyl saccharide surfactant,
   wherein the at least one alkyl saccharide surfactant comprises at least one saccharide moiety head and at least one alkyl chain tail.

2. The ink jet ink composition of claim 1, wherein the at least one alkyl saccharide surfactant decreases a drying time for the ink composition, as compared to a drying time for a conventional ink composition that does not include the alkyl saccharide surfactant.

3. The ink jet ink composition of claim 1, wherein the at least one alkyl saccharide surfactant is an alkyl polyglycoside represented by the formula: $RO(S)_n$, wherein R is an alkyl chain having from about eight to about 18 carbon atoms; S is a saccharide moiety having about five or six carbon atoms; and n is a number having a value from about one to about six.

4. The ink jet ink composition of claim 1, wherein the at least one alkyl saccharide surfactant comprises one saccharide moiety head and one alkyl chain tail.

5. The ink jet ink composition of claim 1, wherein the at least one alkyl saccharide surfactant comprises from about two to about eight saccharide moiety heads and from about two to about eight alkyl chain tails.

6. The ink jet ink composition of claim 1, wherein the at least one saccharide moiety head is selected from the group consisting of monosaccharides, disaccharides, oligosaccharides and polysaccharides.

7. The ink jet ink composition of claim 1, wherein the at least one saccharide moiety head is glucose.

8. The ink jet ink composition of claim 1, wherein the at least one saccharide moiety head is an open-ringed saccharide.

9. The ink jet ink composition of claim 8, wherein the open-ringed saccharide is a polyol containing from about two to about eight hydroxyl groups.

10. The ink jet ink composition of claim 1, wherein the at least one alkyl saccharide surfactant is included in an amount of from about 0.1 to about 30% by weight of the total weight of the ink jet ink composition.

11. The ink jet ink composition of claim 1, wherein the at least one alkyl saccharide surfactant is included in an amount of from about 0.5 to about 5% by weight of the ink jet ink composition.

12. The ink jet ink composition of claim 1, wherein the at least one alkyl glycoside surfactant is included in an amount of about 1% by weight of the ink jet ink composition.

13. The ink jet ink composition of claim 1, further comprising at least one penetrant.

14. The ink jet ink composition of claim 13, wherein the at least one penetrant comprises 1-octyl-2-pyrrolidinone.

15. The ink jet ink composition of claim 1, wherein the colorant is selected from the group consisting of a dye, a pigment, and a mixture of a dye and a pigment.

16. The ink jet ink composition of claim 1, further comprising at least one member selected from the group consisting of anti-clogging agents, polymeric additives, anti-kogation additives, anti-curl agents, humectants, biocides, anti-bleed agents, color-bleeding additives, colorants, inks, dyes, pigments and pH buffering agents.

17. The ink jet ink composition of claim 1, wherein the liquid vehicle comprises water.

18. The ink jet ink composition of claim 1, wherein the liquid vehicle comprises water and at least one co-solvent.

19. A method of making the ink jet ink composition of claim 1, comprising admixing the liquid vehicle, the colorant and the at least one alkyl saccharide surfactant.

20. A method of making the ink jet ink composition of claim 1, comprising admixing the at least one alkyl saccharide surfactant with a conventional ink jet ink composition that comprises a liquid vehicle and a colorant.

21. An ink jet ink composition prepared by admixing water, a colorant and at least one alkyl saccharide surfactant, wherein the at least one surfactant comprises at least one saccharide moiety head and at least one alkyl chain tail.

22. A printing process comprising:

incorporating into an ink jet printing apparatus an ink composition according to claim 1; and ejecting droplets of the ink jet ink composition in an image-wise pattern onto a subtrate.

23. A process according to claim 22, wherein the printing apparatus employs a thermal ink jet process wherein the ink in nozzles of the printing apparatus is selectively heated in an image-wise pattern, thereby causing droplets of the ink to be ejected in the image-wise pattern.

24. A process according to claim 22, wherein the printing apparatus employs an acoustic ink jet process wherein droplets of the ink are caused to be ejected in the image-wise pattern by acoustic beams.

* * * * *